United States Patent
Proidl

(10) Patent No.: US 10,382,819 B2
(45) Date of Patent: Aug. 13, 2019

(54) METHOD AND APPARATUS FOR SELECTING AT LEAST ONE MEDIA ITEM

(75) Inventor: Adolf Proidl, Eindhoven (AT)

(73) Assignee: S.I.SV.EL. SOCIETA ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 84 days.

(21) Appl. No.: 13/817,063

(22) PCT Filed: Aug. 11, 2011

(86) PCT No.: PCT/IB2011/053582
§ 371 (c)(1),
(2), (4) Date: Feb. 14, 2013

(87) PCT Pub. No.: WO2012/023091
PCT Pub. Date: Feb. 23, 2012

(65) Prior Publication Data
US 2013/0152114 A1    Jun. 13, 2013

(30) Foreign Application Priority Data
Aug. 16, 2010  (EP) .................................. 10172856

(51) Int. Cl.
G06F 3/00       (2006.01)
G06F 13/00      (2006.01)
H04N 5/445      (2011.01)
H04N 21/442     (2011.01)
H04N 21/458     (2011.01)
H04N 21/466     (2011.01)
H04N 21/475     (2011.01)
H04N 21/482     (2011.01)
H04N 21/84      (2011.01)
(Continued)

(52) U.S. Cl.
CPC ..... *H04N 21/44222* (2013.01); *G06F 16/337* (2019.01); *G06F 16/735* (2019.01); *G06F 16/743* (2019.01); *G06F 16/78* (2019.01); *H04N 21/4586* (2013.01); *H04N 21/466* (2013.01); *H04N 21/4755* (2013.01); *H04N 21/4756* (2013.01); *H04N 21/482* (2013.01); *H04N 21/4828* (2013.01); *H04N 21/84* (2013.01)

(58) Field of Classification Search
None
See application file for complete search history.

(56) References Cited

U.S. PATENT DOCUMENTS 5,410,344 A * 4/1995 Graves et al. ................. 725/46
5,880,768 A * 3/1999 Lemmons et al. ............. 725/41
(Continued)

FOREIGN PATENT DOCUMENTS

JP  2000285141 A  10/2000
JP  2003157285 A  5/2005
WO WO0045319 A1  8/2000

*Primary Examiner* — William J Kim
(74) *Attorney, Agent, or Firm* — Workman Nydegger

(57) ABSTRACT

Items having a plurality of attributes associated therewith, each of said associated attributes having a rating, the rating indicating the importance of the attribute to the user can be selected (201) and displayed (205) with its associated attributes and corresponding ratings. The ratings can be adjusted (207) and at least one item similar to one of the selected at least one first item is selected (209) based on the rating of at least one of the displayed attributes.

16 Claims, 3 Drawing Sheets

(51) Int. Cl.
*G06F 16/74* (2019.01)
*G06F 16/78* (2019.01)
*G06F 16/735* (2019.01)
*G06F 16/335* (2019.01)

(56) References Cited

U.S. PATENT DOCUMENTS

| | | | |
|---|---|---|---|
| 5,890,152 A * | 3/1999 | Rapaport | G06F 17/30867 |
| 6,006,225 A * | 12/1999 | Bowman | G06F 16/3325 |
| 6,029,195 A * | 2/2000 | Herz | 725/116 |
| 6,269,395 B1 | 7/2001 | Blatherwick et al. | 709/219 |
| 6,327,593 B1 * | 12/2001 | Goiffon | G06F 16/2272 |
| 7,072,888 B1 * | 7/2006 | Perkins | G06F 17/30867 |
| | | | 707/733 |
| 7,082,428 B1 * | 7/2006 | Denny | G06F 17/30646 |
| 7,117,207 B1 * | 10/2006 | Kerschberg | G06F 16/337 |
| 7,571,155 B2 * | 8/2009 | Choi | G06Q 10/10 |
| | | | 705/37 |
| 7,617,511 B2 * | 11/2009 | Marsh | 725/45 |
| 8,286,206 B1 * | 10/2012 | Aaron et al. | 725/46 |
| 8,316,037 B1 * | 11/2012 | Garg | G06F 16/9535 |
| | | | 707/758 |
| 8,719,251 B1 * | 5/2014 | English | G06F 17/30864 |
| | | | 707/713 |
| 8,898,713 B1 * | 11/2014 | Price | 725/94 |
| 2001/0042060 A1 * | 11/2001 | Rouse | G06F 16/54 |
| 2002/0002438 A1 * | 1/2002 | Ohmura | G01C 21/3682 |
| | | | 701/532 |
| 2002/0065677 A1 * | 5/2002 | Grainger et al. | 705/1 |
| 2002/0087526 A1 * | 7/2002 | Rao | G06F 17/30867 |
| 2002/0198866 A1 * | 12/2002 | Kraft | G06F 17/30864 |
| 2003/0126227 A1 * | 7/2003 | Zimmerman | H04N 5/44543 |
| | | | 709/217 |
| 2003/0195872 A1 * | 10/2003 | Senn | G06F 17/30864 |
| 2003/0215144 A1 * | 11/2003 | Kito et al. | 382/190 |
| 2003/0225777 A1 * | 12/2003 | Marsh | 707/101 |
| 2003/0226145 A1 * | 12/2003 | Marsh | H04N 7/163 |
| | | | 725/46 |
| 2004/0117831 A1 * | 6/2004 | Ellis et al. | 725/53 |
| 2004/0221310 A1 * | 11/2004 | Herrington | H04N 5/44543 |
| | | | 725/46 |
| 2005/0065811 A1 * | 3/2005 | Chu | G06Q 30/02 |
| | | | 705/500 |
| 2005/0131762 A1 | 6/2005 | Bharat | |
| 2005/0222981 A1 * | 10/2005 | Lawrence | G06F 17/30864 |
| 2006/0020962 A1 * | 1/2006 | Stark | G06F 17/30861 |
| | | | 725/32 |
| 2006/0041548 A1 * | 2/2006 | Parsons | G06F 17/30873 |
| 2006/0168622 A1 * | 7/2006 | Poll et al. | 725/46 |
| 2006/0212900 A1 * | 9/2006 | Ismail et al. | 725/34 |
| 2006/0242135 A1 * | 10/2006 | Weare | G06F 16/9535 |
| 2006/0253421 A1 * | 11/2006 | Chen | G06F 16/903 |
| 2006/0265283 A1 * | 11/2006 | Gorodyansky | G06Q 30/02 |
| | | | 705/14.46 |
| 2007/0022440 A1 * | 1/2007 | Gutta | 725/46 |
| 2007/0022442 A1 * | 1/2007 | Gil | G06F 17/30905 |
| | | | 725/62 |
| 2007/0130605 A1 * | 6/2007 | Chung | 725/131 |
| 2007/0185830 A1 * | 8/2007 | Rubel | G06F 17/30554 |
| 2007/0276733 A1 * | 11/2007 | Geshwind | G06Q 30/02 |
| | | | 705/14.49 |
| 2007/0276811 A1 * | 11/2007 | Rosen | G06F 3/0483 |
| 2007/0297758 A1 * | 12/2007 | Seo | G11B 27/329 |
| | | | 386/239 |
| 2008/0072180 A1 * | 3/2008 | Chevalier | G06F 17/3089 |
| | | | 715/861 |
| 2008/0097863 A1 * | 4/2008 | Spiegelman | 705/26 |
| 2008/0120289 A1 * | 5/2008 | Golan | G06F 16/34 |
| 2008/0216106 A1 * | 9/2008 | Maxwell et al. | 725/1 |
| 2008/0256579 A1 * | 10/2008 | Verhaegh et al. | 725/46 |
| 2008/0270389 A1 * | 10/2008 | Jones | G06F 17/30648 |
| 2008/0276278 A1 * | 11/2008 | Krieger et al. | 725/40 |
| 2008/0320531 A1 * | 12/2008 | Kim et al. | 725/87 |
| 2009/0006216 A1 * | 1/2009 | Blumenthal | G06F 17/30864 |
| | | | 705/26.62 |
| 2009/0012799 A1 * | 1/2009 | Hornthal | G06Q 10/025 |
| | | | 705/6 |
| 2009/0055338 A1 * | 2/2009 | Kellogg | G06N 5/02 |
| | | | 706/46 |
| 2009/0077033 A1 * | 3/2009 | McGary | G06F 17/30867 |
| 2009/0119263 A1 * | 5/2009 | Jones | G06F 17/30964 |
| 2009/0157523 A1 * | 6/2009 | Jones | G06Q 30/00 |
| | | | 705/26.1 |
| 2009/0234834 A1 * | 9/2009 | Cozzi | G06F 16/9535 |
| 2009/0300476 A1 * | 12/2009 | Vogel | G06F 17/30864 |
| | | | 715/234 |
| 2009/0320070 A1 * | 12/2009 | Inoguchi | 725/40 |
| 2010/0088307 A1 * | 4/2010 | Watanabe | G06F 17/30637 |
| | | | 707/706 |
| 2010/0153324 A1 * | 6/2010 | Downs | G06F 17/2745 |
| | | | 706/21 |
| 2010/0251162 A1 * | 9/2010 | Stallings et al. | 715/777 |
| 2010/0306805 A1 * | 12/2010 | Neumeier et al. | 725/60 |
| 2011/0029514 A1 * | 2/2011 | Kerschberg | G06F 17/30648 |
| | | | 707/732 |
| 2011/0099164 A1 * | 4/2011 | Melman | G06F 17/3064 |
| | | | 707/723 |
| 2011/0145822 A1 * | 6/2011 | Rowe | G06Q 10/10 |
| | | | 718/100 |
| 2011/0225156 A1 * | 9/2011 | Pavlik | G06F 17/30038 |
| | | | 707/737 |
| 2011/0252031 A1 * | 10/2011 | Blumenthal | G06F 17/30864 |
| | | | 707/733 |
| 2012/0060186 A1 * | 3/2012 | Ueno | 725/40 |
| 2012/0089996 A1 * | 4/2012 | Ramer et al. | 725/14 |
| 2012/0173502 A1 * | 7/2012 | Kumar | G06F 16/48 |
| | | | 707/706 |

* cited by examiner

METHOD AND APPARATUS FOR SELECTING AT LEAST ONE MEDIA ITEM

FIELD OF THE INVENTION

The present invention relates to a method and apparatus for selecting at least one item. In particular, but not exclusively, it relates to automatically selecting content items or content assets.

BACKGROUND OF THE INVENTION

The number of available content assets, such as digital, audiovisual assets that can be consumed at any point in time is exploding. As a result, instant, interest driven access to that expanding content universe is becoming more and more important. Digitalization of audiovisual materials together with the broad availability of high speed data transfer has resulted in an ever increasing amount of content that any consumer has available for consumption at any point in time. Examples of large repositories of audiovisual assets on the internet are YouTube, Netflix, and Hulu. They are competing with digital, live TV channels and VoD libraries, offered by TV service providers, e.g. Comcast.

As the consumer's time to select and enjoy the available content assets doesn't increase the importance of conveniently controllable guidance towards the most interesting and appropriate audiovisual content gains in importance.

Typically internet sites, service providers, and device manufacturers offer solutions that allow users to search and navigate their content offerings. The first of these is a simple input means for search using text entry, for example, the search bar from Google or YouTube. Such searching is essentially easy to use (at least on a PC), but returns a lot of results that are irrelevant. Attempting to improve the detail of the search request instantly requires the user to go back one step in the search process which is cumbersome and may take many attempts to obtain good results, which is time consuming. Some sites (e.g. specifications like "site:www.philips.com" or "Include entire text"), require expert skills, which makes the solution unsuitable to the general public.

Another known technique is implicit input means, e.g. tracking what the user is browsing via cookies, making use of his purchase history etc. This takes significant time, before providing useful recommendations. Furthermore, this technique does not allow the user to specifically express his interests.

A further known technique is the use of comparative input means, for example, rating a movie as "liked" or "disliked". This is equally effective as a simple input means, allowing the user to refine the result on the go without going back. However, as above it returns, at least initially, many irrelevant results and can be time consuming to refine it to obtain useful results.

Another known technique uses complex input means, for example, allowing the user to explicitly state his preferences like "I love Alfred Hitchcock" but "slightly dislike Horror Movies". This allows more control of search results and navigation, but is too overwhelming to be useful for the general public, especially as the user first needs to understand which criteria can be used to constrain the result set, and how they need to be applied. Also these techniques are not suited to refine on the go.

An example of such a complex input means is disclosed by U.S. Pat. No. 7,617,511 in which, whilst browsing an electronic programming guide (EPG), the user can enter new preference ratings or modify previously saved ratings for program attributes. This results in recommendations being made based on the user's preferences. However, as mentioned above, the user first needs to understand how the criteria are used and how to apply it. Furthermore, any further browsing of the EPG is limited to these preferences.

SUMMARY OF THE INVENTION

The present invention seeks to provide improved browsing of items allowing easy refinement of selections.

This is achieved according to a first aspect of the present invention by a method for selecting at least one item, the method comprising the steps of: selecting at least one first item, each of the selected at least one first item having a plurality of attributes associated therewith, each of the associated attributes having a rating, the rating indicating the importance of the attribute to the user; displaying each of the selected at least one first item and its associated attributes and corresponding ratings; allowing adjustment of the ratings of any one of the displayed associated attributes; selecting at least one item similar to one of the selected at least one first item based on the rating of at least one of the displayed attributes.

This is also achieved according to a second aspect of the present invention by apparatus for selecting at least one item, the apparatus comprising: a processor for selecting at least one first item, each of the selected at least one first item having a plurality of attributes associated therewith, each of the associated attributes having a rating, the rating indicating the importance of the attribute to the user; a controller for controlling a display for displaying each of the selected at least one first item and its associated attributes and corresponding ratings; an interface for communicating with a user interface device for allowing adjustment of the ratings of any one of the displayed associated attributes; the processor selecting at least one item similar to one of the selected at least one first item based on the rating of at least one of the displayed attributes.

As a result a first selection is made. This may comprise a search of items, like content assets for example, to retrieve the selection based on criteria, for example, a plurality of search terms. This first selection is displayed and browsed by the user if desired. For each displayed item, attributes are identified. This may be, for example, the criteria which were used to select the items, i.e. the search terms. The user can then provide a rating for any of these attributes indicating the importance of the attribute to the user in the selection. The user thus has a clear indication of how the selection of similar items is made, i.e. how the attributes will be used to refine the search. Furthermore, selection is not limited to the user's preferences.

Optionally a selection of the most relevant attributes is made per item so as to reduce the burden on the user in rating attributes. The most relevant may be determined from the user's profile or currently indicated preferences. Any adjustment the user performs on a rating may also be used to update the user's profile to improve the selection of items and/or of attributes to be rated.

The interface for input of ratings may be placed in the user interface directly, for example, included in a display of the interface device and/or the display of the selected items, making the user aware of the configurable options and allowing the user to instantly provide input in the context of the result page.

This may allow the user to refine his profile, search query, or preferences. As a result, there is no need to leave the navigation of items, such as content assets, to adjust/refine a profile, search query, or preference input screen and the adjustment takes place directly in the appropriate context, allowing the user the conveniently take confident decisions, while developing trust in the solution as a whole.

BRIEF DESCRIPTION OF DRAWINGS

For a more complete understanding of the present invention, reference is made to the following description in conjunction with the accompanying drawings, in which.

DETAILED DESCRIPTION OF AN EMBODIMENT OF THE INVENTION

Figure 1:
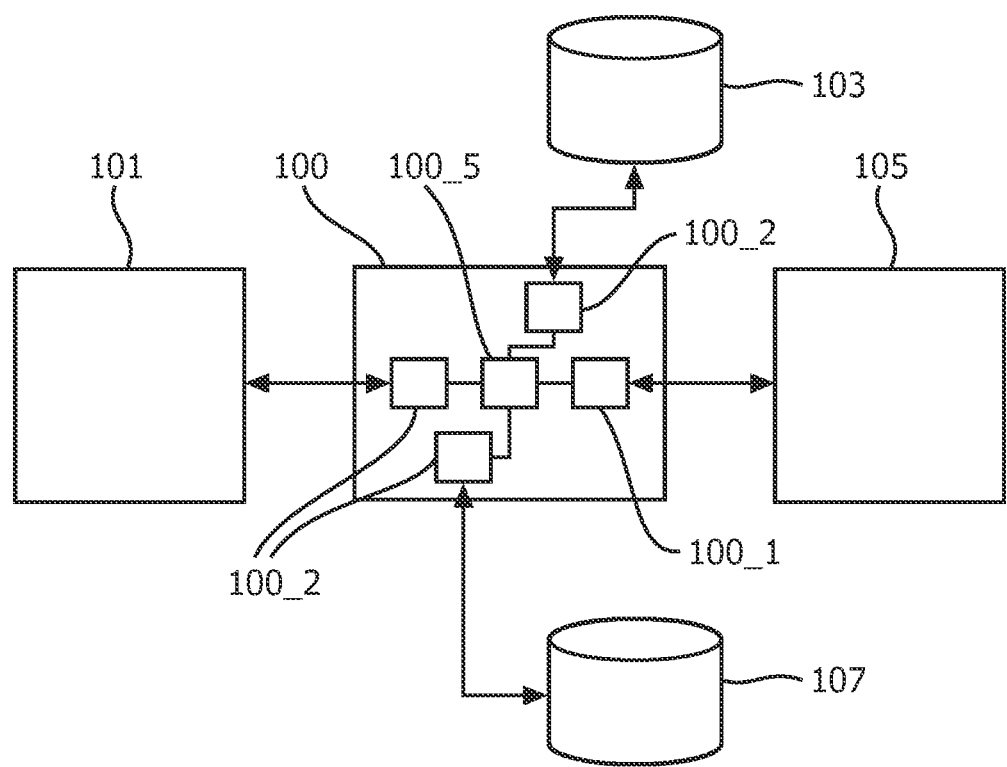
FIG. 1 is simple schematic of the apparatus according to an embodiment of the present invention.
Figure 2:
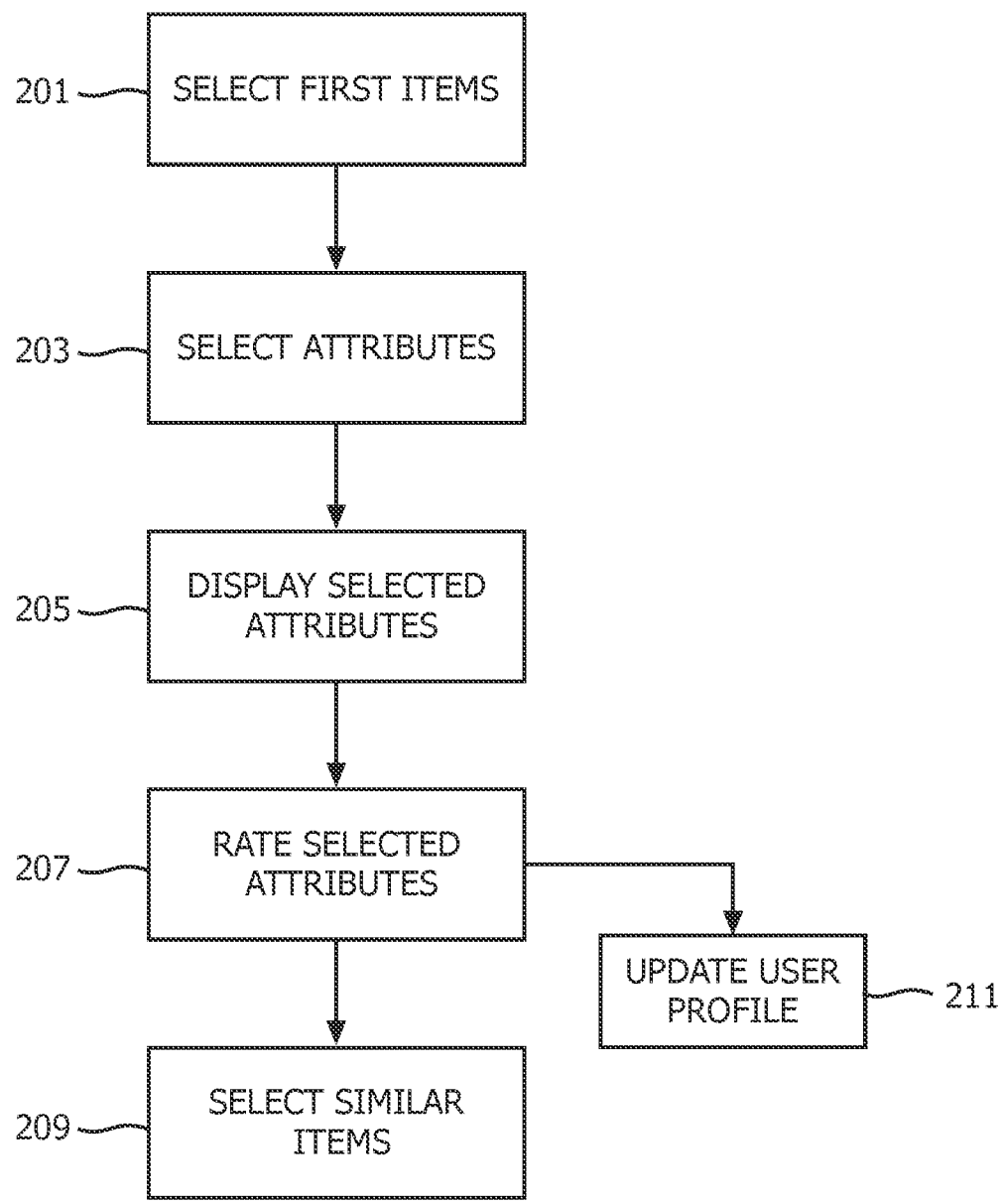
FIG. 2 is a flowchart of the method of selecting an item according to an embodiment of the present invention.

With reference to FIG. 1, the apparatus 100 comprises a processor (100_5) connected to a controller (100_1) for controlling the output for a display means 105, interface means (100_2) for communicating with storage devices 103, 107 and an interface device 101. The apparatus 100 may comprise a PC having a monitor 105 and a keyboard 101, a local memory device 107 and connection via a network such as the internet to a remote storage device 103. Alternatively, the apparatus 100 may comprise a set top box having a local memory device 107 communicating with a television 105, a remote control device 101 and a remote storage device 103 via the internet, for example. Although the storage devices 107, 103 are illustrated here as separate devices, it can be understood that they may comprise a single storage device integrated within the apparatus 100 or remote thereof.

Operation of the apparatus 100 will now be described with reference to FIGS. 1 to 4.

A first selection of items is made, step 201. This may involve use of a search engine such as Google to input search terms or browsing recommendations of content assets on a television screen. These items are retrieved from a storage means 103 and displayed on the display means 105. Examples of screen shots of such a display are shown in FIGS. 3 and 4.

Figure 3:
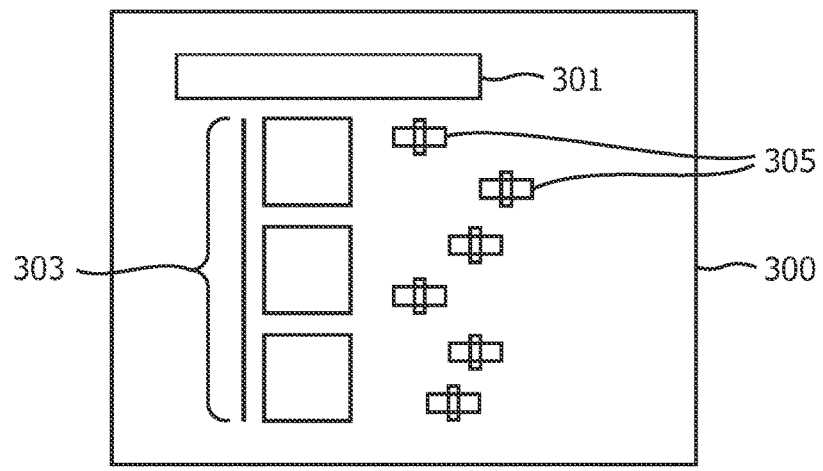
FIG. 3 is an illustration of an example of a screen shot according to an embodiment of the present invention.

In FIG. 3, a window 301 is provided in which the search terms are entered and displayed. Below this window 301 a list of selected items 303 retrieved from the storage means 103 is displayed. For each item 303, attributes of the item are selected, step 203 and highlighted on the display, step 205. The attributes may be selected by selecting those which are considered most relevant to the user. This may be based on the content of the user's profile and/or their preference stored in the storage means 107. Alongside each attribute a slider 305 is displayed. The slider 305 (or alternatively other rating devices such as a star rating) may be used. Via the interface device 101 the user then rates any one of the attributes, step 207, indicating which is of importance to the user. These rating are then used to select similar items, or refine the initial selection taking into account the ratings and therefore, taking into consideration those attributes that are of more importance to the user, step 209. The ratings may be used to update the user's profile, step 211. If a rating is not known for a particular attribute then a default value may be used.

Figure 4:
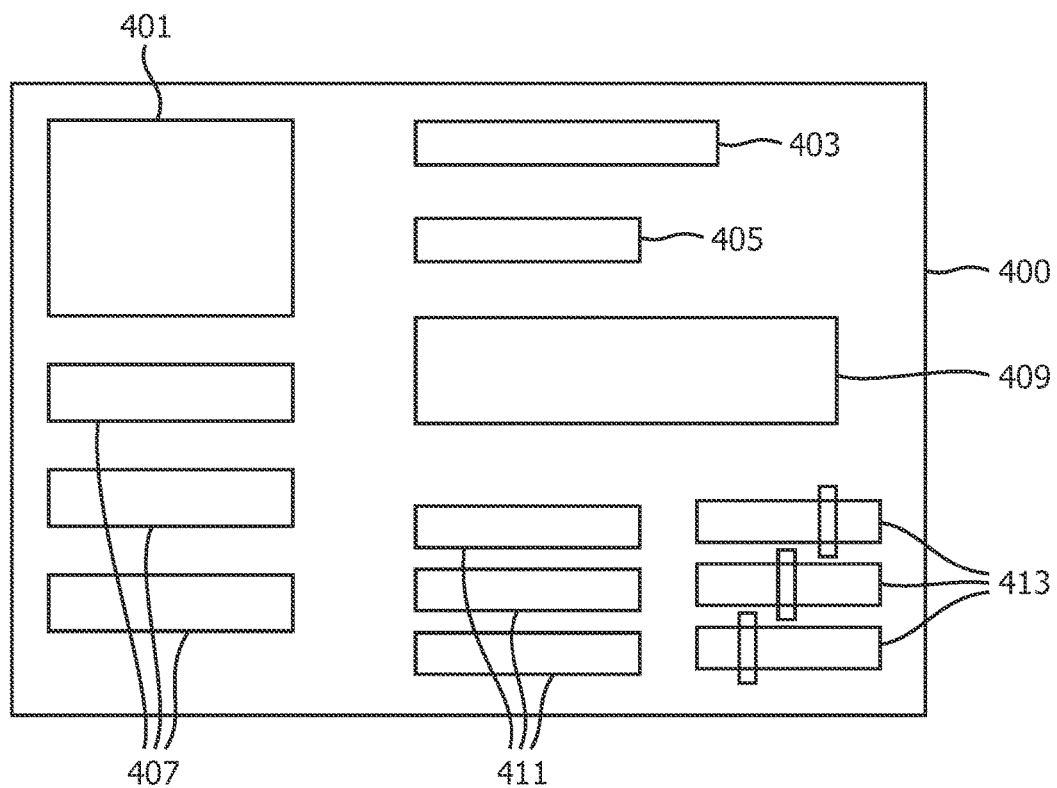
FIG. 4 is an illustration of an example of a screen shot according to an alternative embodiment of the present invention.

In an alternative embodiment, in FIG. 4, content assets may be retrieved from the storage means 103 and displayed on the display means 105 as shown for example in FIG. 4, Each content item may be displayed to show a representative image 401 of the asset. Details of the asset, such as title 403, price 405 etc. A synopsis 409 of the asset and selected attributes 411 may be displayed. The attributes may include a list of actors, the genre, format etc. The attributes are displayed with a corresponding slider 413 (or the like) indicating the rating, which may correspond to a setting retrieved from a user profile, and which may be adjusted by the user as required.

In a specific example, with reference to FIG. 3, the user uses a search engine such as Google to carry out a video search. The user starts from the usual text entry 301 looking for "documentary programs" related to "earth".

A list 303 of a first selection is shown below. For each item, an attribute, for example, "HD material only", or a particular source, e.g. "YouTube" is highlighted. These are highlighted and a rating can be provided so that the user can indicate the importance of any one attribute to provide preference input related to search results in order to improve the relevancy performance of the listed items. For example, the attributes may include any one of the search terms and the user can indicate how important they are for the selection of items. The attributes, in this specific example, may include the preference on the media source of the selected item (video). Other attributes may be implied from ontologies, e.g. that if a search is performed for the term "documentaries" then for the attribute media source "BBC" is a relevant value that should be displayed for rating. The ratings can then be used to de-prioritize search terms in order to refine the search or select items that have similar attributes that are important to the user.

The user can now directly give feedback, specifying that "documentaries" and the "BBC" are important for him, but "YouTube" as a source isn't. In an embodiment, as soon as one of the sliders 305 is adjusted a control button appears, e.g. marked with the text "Search Again" next to the display of the corresponding item. In this way it is very easy to quickly refine the search taking full advantage of the knowledge available in the search/recommendation engine, but without overloading the user with options.

As shown in FIG. 4 and described above, a typical program detail view, presented when a user browses the VoD library of multi-service operator is shown as another specific example. In the left lower part 407 of the screen, a list of selected similar movies are shown to increase the probability of a sale.

In an embodiment, all relevant attributes 411 are directly shown on the details screen allowing the user to give feedback. Such feedback will instantly change the list of recommendations on the left lower part 407 of the screen, and also the corresponding ratings 413.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

As will be apparent to a person skilled in the art, the elements listed in the apparatus claims are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. A method for selecting at least one item, the method comprising:
    detecting, by a processor of a computing device, an input of search criteria entered by a user via an input device;
    retrieving, by the processor, settings of a user profile of said user, said settings stored in a storage device;
    in response to the input of said search criteria:
        determining by the processor at least one attribute to display, wherein the at least one attribute includes or is derived from at least one of the search criteria entered via the input device;
        displaying search results on a display device, the search results comprising:
            at least one item corresponding to said search criteria,
            the at least one attribute associated with each item, and
            a ratings adjustment image associated with each attribute, said rating adjustment image showing a value of the rating associated with each attribute, wherein each rating associated to the attribute indicates a degree of preference of the attribute to the user and wherein the determination of the value of each rating is based on said user profile; and
        when an adjustment of a rating associated with a given attribute is detected via the ratings adjustment image, displaying a control button to permit a reselection of items based on said search criteria and on the adjustment via the ratings adjustment image, wherein the control button is included in the display of the search results such that new search results can be retrieved without leaving a navigation of the search results displayed on the display device; and
        in response to input detected via the control button, displaying the new search results on the display device, the new search results comprising at least one item corresponding to said search criteria and the adjustment of the rating associated with the given attribute.

2. The method according to claim 1, further comprising updating said user profile based on the adjustment of the rating; and
    determining the rating of each attribute associated with each selected item based on said updated said user profile.

3. The method according to claim 1, further comprising selecting an attribute that is most relevant based on a said user profile.

4. The method according to claim 3, wherein selecting the most relevant attribute is based on user preferences or said user profile.

5. The method of claim 1, wherein the at least one attribute is ontologically derived from at least one of the search criteria.

6. The method of claim 1, further comprising updating the user profile based on the adjustment of the rating.

7. A non-transitory computer readable tangible medium having an executable code stored thereon, the executable code, when executed by at least one processor, carrying out a method comprising:
    detecting an input of search criteria entered by a user via an input device;
    retrieving settings of a user profile of said user, said setting stored in a storage device;
    in response to the input of said search criteria:
        determining at least one attribute to display, wherein the at least one attribute includes or is derived from at least one of the search criteria entered via the input device;
        displaying search results on a display device, the search results comprising:
            at least one item corresponding to said search criteria,
            the at least one attribute associated with each item, and
            a ratings adjustment image associated with each attribute, said rating adjustment image showing a value of the rating associated with each attribute, wherein each rating associated to the attribute indicates a degree of preference of the attribute to the user and wherein the determination of the value of each rating is based on said user profile; and
        when an adjustment of a rating associated with a given attribute is detected via the ratings adjustment image, displaying a control button to permit a reselection of items based on said search criteria and on the adjustment via the ratings adjustment image, wherein the control button is included in the display of said search results such that the new search results can be retrieved without leaving a navigation of the search results displayed on the display device; and
        in response to input detected via the control button, displaying new search results on the display device, the new search results comprising at least one item corresponding to the search criteria and the adjustment of the rating associated with the given attribute.

8. The medium of claim 7, wherein the processor is configured to update the user profile based on the adjustment of the rating.

9. The medium of claim 7, wherein the at least one attribute is ontologically derived from at least one of the search criteria.

10. An apparatus for selecting at least one item, the apparatus comprising:
    an interface;
    a memory;
    a display; and
    a processor configured to:

detect an input, via the interface, of search criteria entered by a user via an input device;

retrieve settings of a user profile of said user from said memory;

in response to the input of said search criteria:

determine at least one attribute to display, wherein the at least one attribute includes or is derived from at least one of the search criteria entered via the input device;

display search results on the display, the search results comprising:

at least one item corresponding to said search criteria, the at least one attribute associated with each item, and a ratings adjustment image associated with each attribute, said rating adjustment image showing a value of the rating associated with each attribute, wherein each rating associated to the attribute indicates a degree of preference of the attribute to the user and wherein the determination of the value of each rating is based on said user profile; and when an adjustment of a rating associated with a given attribute is detected via the ratings adjustment image, display a control button to permit a reselection of items based on said search criteria and on the adjustment via the ratings adjustment image, wherein the control button is included in the display of the search results such that new search results can be retrieved without leaving a navigation of the search results displayed on the display;

in response to input detected via the control button, display the new search results on the display, the new search results comprising at least one item corresponding to said search criteria and the adjustment of the at least one rating associated with the given attribute.

11. The apparatus according to claim 10, further comprising a storage device to store said user profile, the said user profile determining a rating of each attribute associated with each item.

12. The apparatus according to claim 10, wherein the said user profile is updated based on the adjustment of the rating, and the rating of each attribute associated with each item is based on the updated said user profile.

13. The apparatus according to claim 10, wherein the processor is further configured to select an attribute that is most relevant based on said user profile.

14. The apparatus according to claim 13, wherein the processor is further configured to select the most relevant attribute based on user preferences or said user profile.

15. The apparatus of claim 10, wherein the processor is configured to update the user profile based on the adjustment of the rating.

16. The apparatus of claim 10, wherein the at least one attribute is ontologically derived from at least one of the search criteria.

* * * * *